US007333100B2

(12) United States Patent
Hsu

(10) Patent No.: US 7,333,100 B2
(45) Date of Patent: Feb. 19, 2008

(54) APPARATUS, METHOD, AND SYSTEM FOR DRIVING FLAT PANEL DISPLAY DEVICES

(75) Inventor: Horng-Bin Hsu, Taipei (TW)

(73) Assignee: AU Optronics Corporation, Hsinchu (TW)

( * ) Notice: Subject to any disclaimer, the term of this patent is extended or adjusted under 35 U.S.C. 154(b) by 661 days.

(21) Appl. No.: 10/862,409

(22) Filed: Jun. 8, 2004

(65) Prior Publication Data

US 2006/0033689 A1 Feb. 16, 2006

(51) Int. Cl.
*G06F 3/038* (2006.01)

(52) U.S. Cl. .......................... 345/208; 345/60; 345/67

(58) Field of Classification Search ............ 345/60–68, 345/208
See application file for complete search history.

(56) References Cited

U.S. PATENT DOCUMENTS 6,288,692 B1 9/2001 Kanazawa et al.
6,879,305 B2 * 4/2005 Takeuchi et al. .............. 345/63
2003/0030598 A1 * 2/2003 Kanazawa et al. ............ 345/60
2003/0076284 A1 * 4/2003 Onozawa et al. ............ 345/60
2004/0207572 A1 * 10/2004 Kishi et al. .................... 345/60
2004/0212567 A1 * 10/2004 Kanazawa et al. ............ 345/60
2004/0233129 A1 * 11/2004 Iwami ......................... 345/60
2004/0233130 A1 * 11/2004 Suzue ......................... 345/60

OTHER PUBLICATIONS

Office Action of its corresponding Chinese patent application issued on Jun. 8, 2007.

* cited by examiner

*Primary Examiner*—Richard Hjerpe
*Assistant Examiner*—Kimnhung Nguyen
(74) *Attorney, Agent, or Firm*—Arent Fox LLP

(57) ABSTRACT

An apparatus, method, and system for driving a display device, the display device having a first plurality and second plurality of row electrodes, with the first plurality being further grouped into a first set and a second set, such that undesired gas discharge and dielectric breakdown will not occur between the electrodes within the PDP, and dissipation of energy is reduced.

11 Claims, 7 Drawing Sheets

Fig. 5(A)
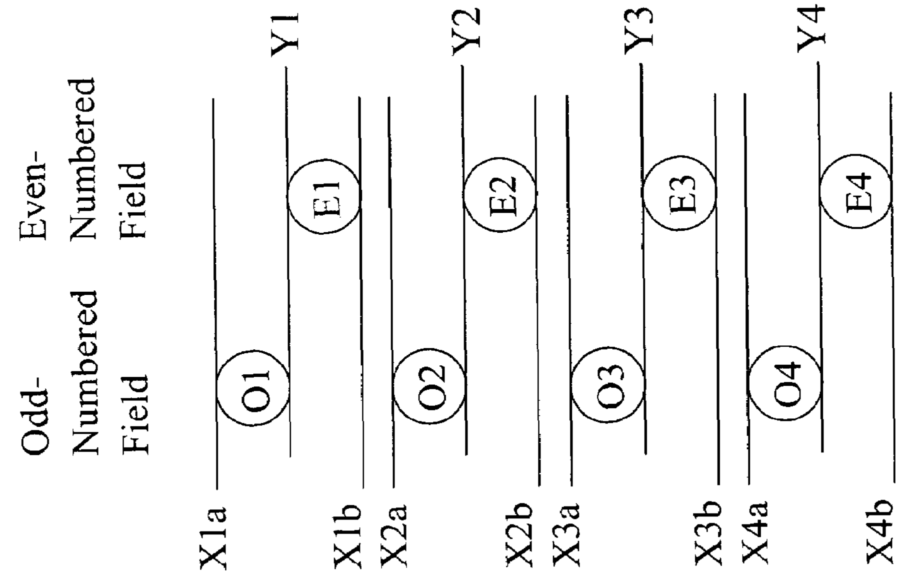
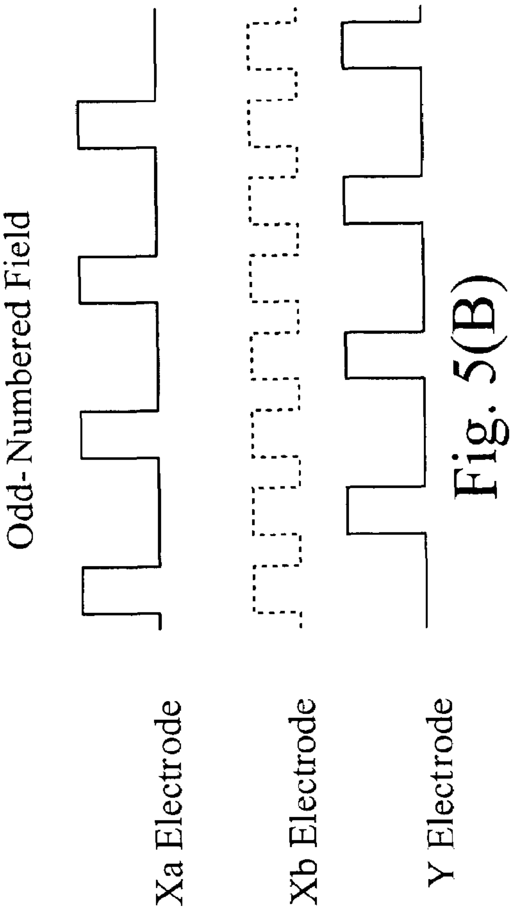
Fig. 5(B)
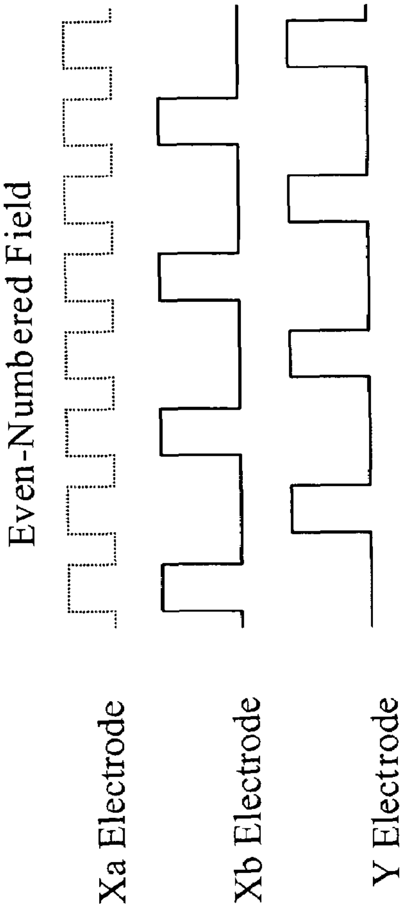
Fig. 5(C)

APPARATUS, METHOD, AND SYSTEM FOR DRIVING FLAT PANEL DISPLAY DEVICES

BACKGROUND OF THE INVENTION

1. Field of Invention

The present invention relates to an apparatus, method and system for driving a display device. In particular, the present invention is directed to an apparatus, method and system for driving a plasma display panel (hereinafter "PDP"), such that undesired gas discharge and dielectric breakdown do not occur between the electrodes within the PDP, and dissipation of energy is reduced.

2. Related Art

FIG. 1 illustrates a top view showing a portion of a conventional PDP 10 having a conventional electrode structure. The PDP 10 is a matrix device having individual cells defined by the intersection of row electrodes X1, Y1, X2, Y2 . . . Xn, Yn, and column electrodes A1, A2, A3 . . . An. The row electrodes X1, Y1, X2, Y2 . . . Xn, Yn, are arranged horizontally along the PDP 10 and the column electrodes A1, A2, A3 . . . An are arranged vertically along the PDP 10. As such, the horizontal and vertical electrodes form a basic grid with cells.

The row electrodes include electrodes such as common or sustain electrodes X1, X2 . . . Xn, and electrodes such as scan electrodes Y1, Y2 . . . Yn. The column electrodes includes electrodes such as address electrodes A1, A2, A3 . . . An.

FIGS. 2 and 3 show a conventional interlaced driving method for the PDP 10 having the electrode structure of FIG. 1. According to the conventional interlaced driving method of FIGS. 2 and 3, the phase difference of the sustain pulses between the electrodes X1, Y1, X2, Y2 . . . Xn, Yn is controlled to determine which cell(s) is to emit visible light.

FIG. 2 shows a conventional driving method for driving the odd-numbered fields of the PDP 10. Based on the conventional odd field driving method of FIG. 2, alternating sustain pulses are applied between the odd-numbered X electrodes X1, X3, X5, etc. and the odd-numbered Y electrodes Y1, Y3, Y5, etc.; and between the even-numbered X electrodes X2, X4, etc. and the even-numbered Y electrodes Y2, Y4, etc. Pursuant to the above method of applying the alternate sustain pulses, gas discharge will occur between the odd-numbered X electrodes X1, X3, X5, etc. and the odd-numbered Y electrodes Y1, Y3, Y5, etc.; and between the even-numbered X electrodes X2, X4, etc. and the even-numbered Y electrodes Y2, Y4. Consequently, the driving method provides no voltage difference between the odd-numbered X electrodes X1, X3, X5, etc. and the even-numbered Y electrodes Y2, Y4, etc.; and between the even-numbered X electrodes X2, X4, etc. and the odd-numbered Y electrodes Y1, Y3, Y5, etc. As such, no gas discharge occurs between the odd-numbered X electrodes X1, X3, X5, etc. and the even-numbered Y electrodes Y2, Y4, etc.; and between the even-numbered X electrodes X2, X4, etc. and the odd-numbered Y electrodes Y1, Y3, Y5, etc.

In addition, FIG. 3 shows a conventional driving method for driving the even-numbered fields of the PDP 10. Based on the conventional even field driving method of FIG. 3, alternating sustain pulses are applied between the odd-numbered X electrodes X1, X3, X5, etc. and the even-numbered Y electrodes Y2, Y4, etc.; and between the even-numbered X electrodes X2, X4, etc. and the odd-numbered Y electrodes Y1, Y3, Y5, etc. According to the above method of applying the alternate sustain pulses, gas discharge will occur between the odd-numbered X electrodes X1, X3, X5, etc. and the even-numbered Y electrodes Y2, Y4, etc.; and between the even-numbered X electrodes X2, X4, etc. and the odd-numbered Y electrodes Y1, Y3, Y5, etc. Consequently, the driving method provides no voltage difference between the odd-numbered X electrodes X1, X3, X5, etc. and the odd-numbered Y electrodes Y1, Y3, Y5, etc.; and between the even-numbered X electrodes X2, X4, etc. and the even-numbered Y electrodes Y2, Y4, etc. As such, no gas discharge occurs between the odd-numbered X electrodes X1, X3, X5, etc. and the odd-numbered Y electrodes Y1, Y3, Y5, etc.; and between the even-numbered X electrodes X2, X4, etc. and the even-numbered Y electrodes Y2, Y4, etc. The conventional interlaced driving method of FIGS. 2 and 3 is only for driving conventional PDP having an electrode structure as shown in FIG. 1. However, the conventional interlaced driving method is not suitable for driving other PDP having an improved electrode structure different from that which is shown in FIG. 1. Accordingly, there is a need to have an apparatus, system and/or method of driving a PDP with an alternative electrode structure in order to prevent undesired gas discharge and dielectric breakdown.

SUMMARY OF THE INVENTION

The present invention provides an apparatus, method, and system for driving a display device, the display device having a first plurality and second plurality of row electrodes, with the first plurality being further grouped into a first set and a second set.

It is an object of the present invention to provide new and improved techniques for driving a display device, which prevent undesired gas discharge.

It is another object of the present invention to provide new and improved techniques for driving a display device, which prevent dielectric breakdown.

It is an advantage of the present invention to provide new and improved techniques for driving a display device, which reduce energy loss and thereby improve the efficiency of the display device.

These and other objects and advantages of the present invention will be fully apparent from the following description, when taken in connection with the annexed drawings.

DESCRIPTION OF THE DRAWINGS

The accompanying drawings, which are included to provide a further understanding of the present invention and are incorporated in and constitute a part of this specification, illustrate examples of the present invention and together with the description serve to explain the principles of the present invention.

In the drawings:

FIGS. 5A-C illustrate an example of a method of driving a PDP according to the present invention;

DETAILED DESCRIPTION OF THE EXEMPLARY EMBODIMENTS

Reference will now be made in detail to the exemplary embodiments of the present invention, examples of which are illustrated in the accompanying drawings.

The present invention relates to an improved apparatus, system and method for driving a display device such as a plasma display device.

Figure 1:
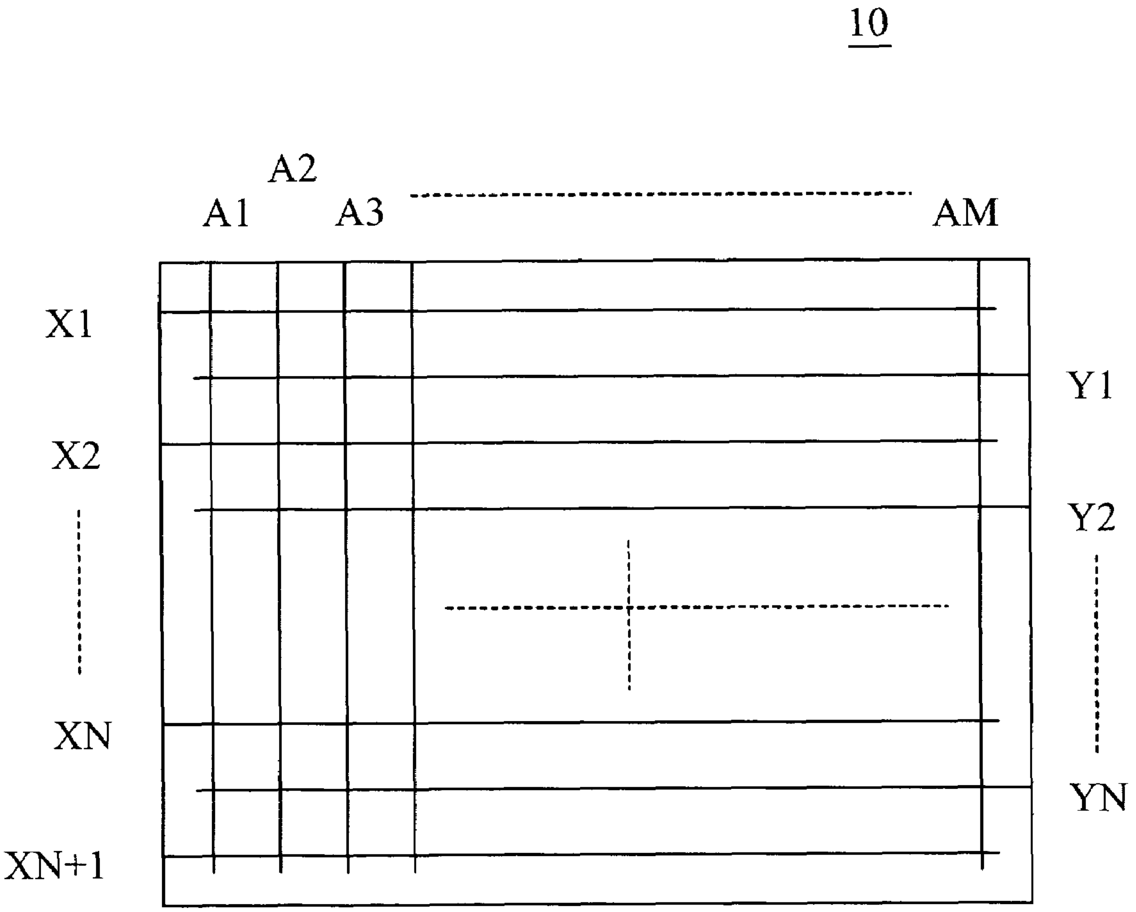
Fig. 1 Prior Art
FIG. 1 illustrates an example of a conventional configuration of row electrodes and column electrodes in a PDP.
Figure 2:
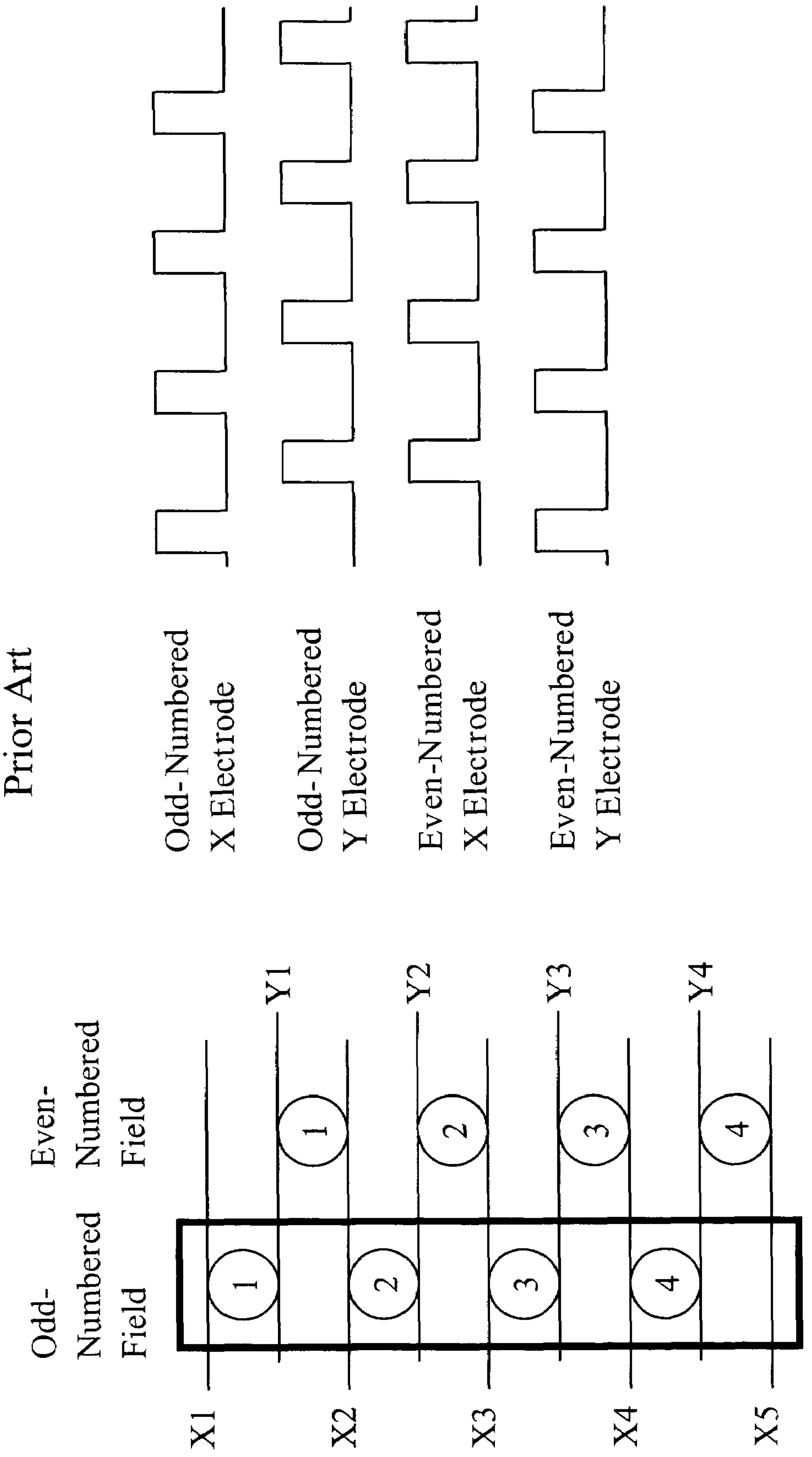
Fig. 2 Prior Art
FIG. 2 illustrates an example of a conventional method for driving odd fields of a PDP.
Figure 3:
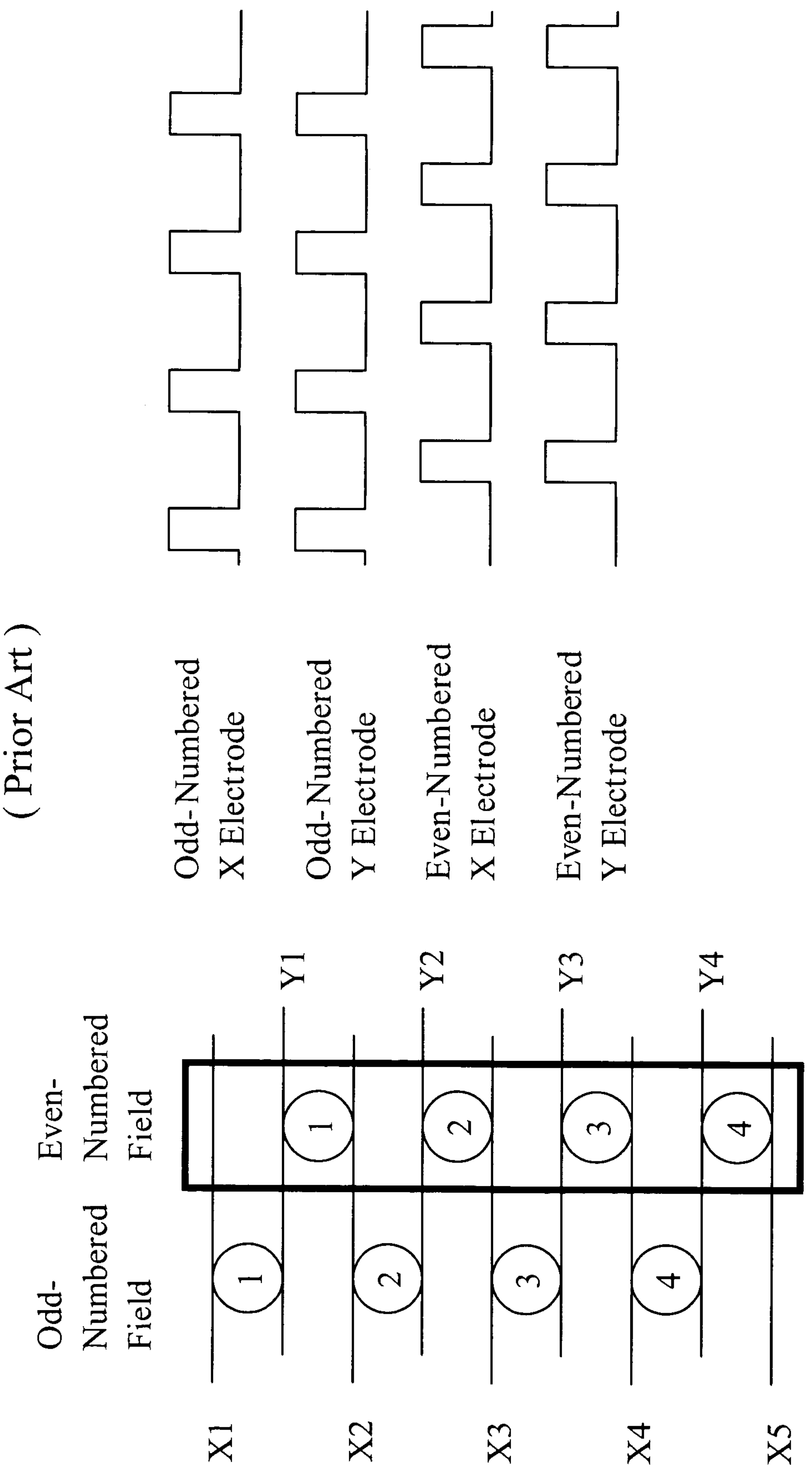
Fig. 3 ( Prior Art )
FIG. 3 illustrates an example of a conventional method for driving even fields of a PDP.
Figure 4:
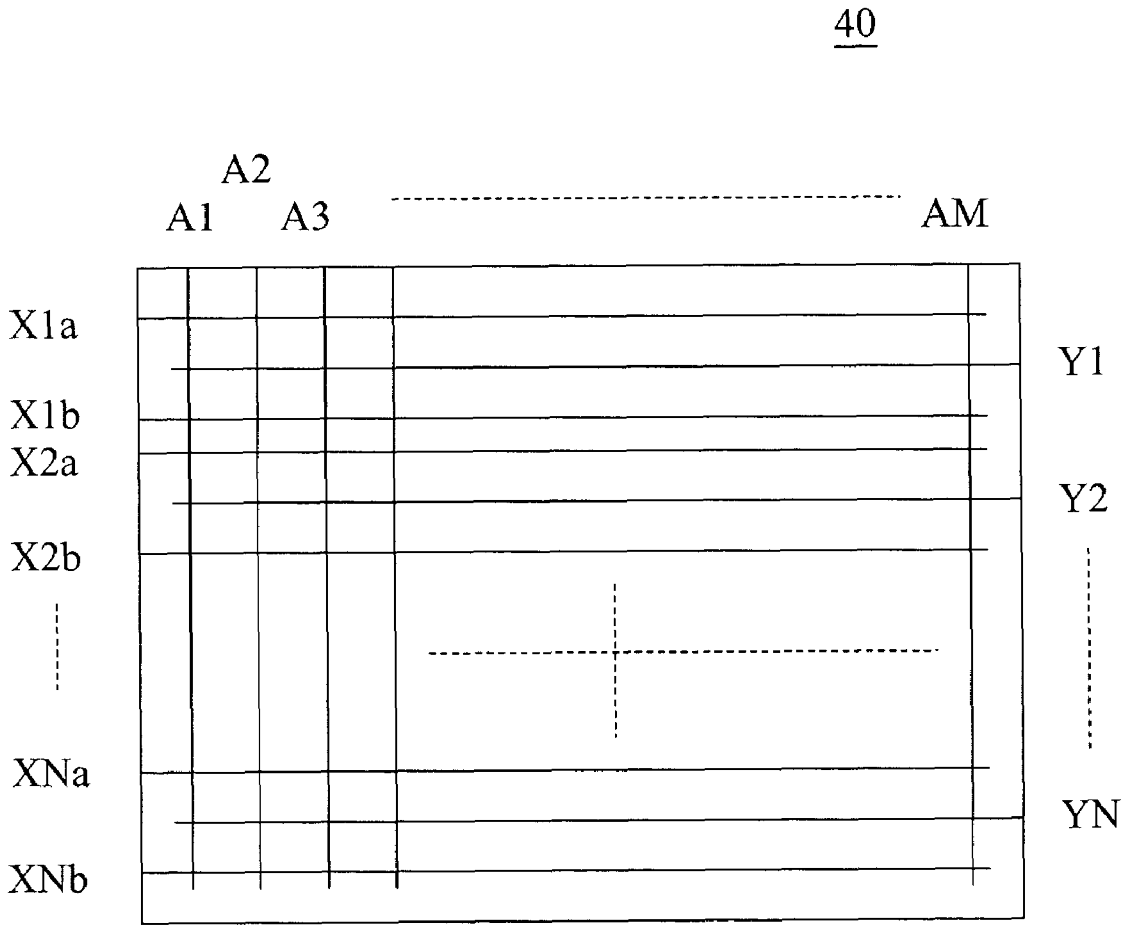
FIG. 4 illustrates an example of a configuration of row electrodes and column electrodes relating to the present invention.

FIG. 4 illustrates a top view showing a portion of PDP 40 having an exemplary electrode structure according to the present invention. The exemplary electrode structure of PDP 40 has a "X-Y-X" electrode structure with row electrodes X1*a*, X1*b*, X2*a*, X2*b* . . . XNa, XNb, and Y1, Y2 . . . YN, and column electrodes A1, A2, A3 . . . AM. Row electrodes X1*a*, X1*b*, X2*a*, X2*b* . . . XNa, XNb, and Y1, Y2 . . . YN, are arranged horizontally along PDP 40 and the column electrodes A1, A2, A3 . . . AM, are arranged vertically along PDP 40. The row electrodes include electrodes such as common or sustain electrodes X1*a*, X1*b*, X2*a*, X2*b* . . . XNa, XNb, and electrodes such as scan electrodes Y1, Y2 . . . YN. Electrodes X1*a*, X2*a*, . . . XNa are called Xa electrodes, electrodes X1*b*, X2*b*, . . . XNb are called Xb electrodes and electrodes Y1, Y2, . . . YN are called Y electrodes The column electrodes includes electrodes such as address electrodes A1, A2, A3 . . . AM.

FIGS. 5(A) through 5(C) illustrate an exemplary driving method of the present invention. Specifically, FIG. 5(A) illustrates an exemplary "X-Y-X" electrode structure of a PDP having odd display lines O1, O2, . . . ON disposed between Xa electrodes and Y electrodes and even display lines E1, E2, . . . EN disposed between Xb electrodes and Y electrodes.

In odd-numbered fields, odd display lines O1, O2, . . . ON is active to display image. Alternant sustain pulses are applied to Xa electrodes and Y electrodes to cause gas discharge while Xb are set to be floating. Since capacitance exists between electrodes, the voltage on the floating electrodes Xb will change in response to the sustain pulses applied to Xa and Y electrodes.

In even-numbered fields, even display lines E1, E2, . . . EN is active to display image. Alternant sustain pulses are applied to Xb electrodes and Y electrodes to cause gas discharge while Xa are set to be floating. Since capacitance exists between electrodes, the voltage on the floating electrodes Xa will change in response to the sustain pulses applied to Xb and Y electrodes.

In the method of the present invention, the voltage difference between Xa and Xb in the sustain period is lower and there is no undesired gas discharge and dielectric breakdown between Xa and Xb. In addition, since the driving circuit does not apply sustain pulses to the floating electrodes, energy loss is also reduced.

Figure 6:
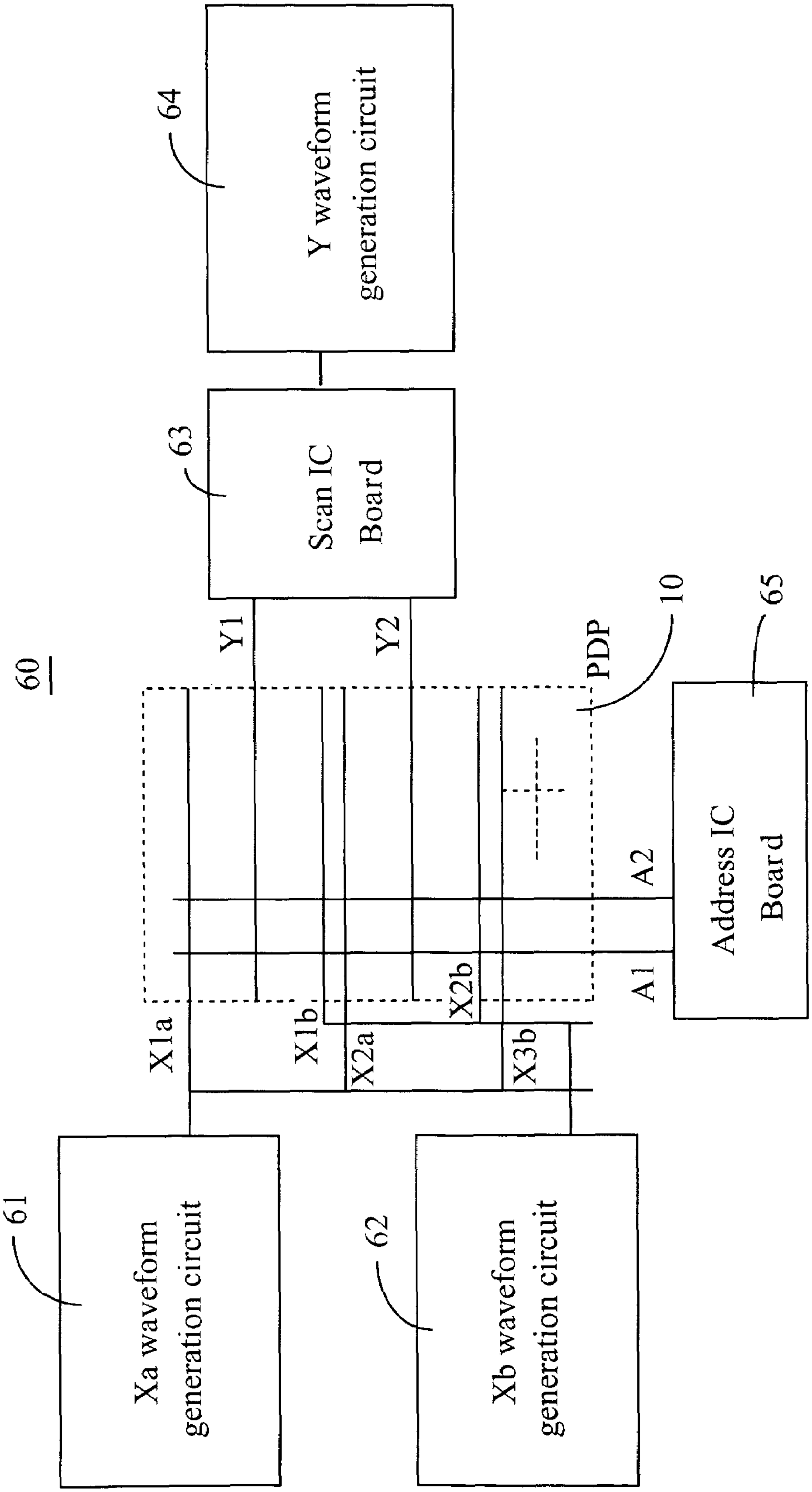
FIG. 6 illustrates an example of a driving apparatus for a PDP according to the present invention.

FIG. 6 illustrates an example of driving apparatus 60 of the present invention. Apparatus 60 includes Xa waveform generation circuit 61 and Xb waveform generation circuit 62 to drive electrodes X1*a*, X2*a*, . . . XNa and electrodes X1*b*, X2*b*, . . . XNb, respectively. In addition, apparatus 60 has scan IC board 63 with Y waveform generation circuit 64 to drive electrodes Y1, Y2, . . . YN. Further, apparatus 60 has address IC board 65 to drive electrodes A1, A2, . . . AN.

In operation, Xa waveform generation circuit 61, Xb waveform generation circuit 62, Y waveform generation circuit 64 and address IC board 65 apply waveforms to Xa, Xb, Y, and A electrodes, respectively. In the sustain period, in order to display odd-numbered fields, the switches in the Xb waveform generation circuit 62 are all turned off and the Xb electrodes are set to be floating. Similarly, in order to display even-numbered fields, the switches in Xa waveform generation circuit 61 are all turned off and the Xa electrodes are set to be floating.

Figure 7:
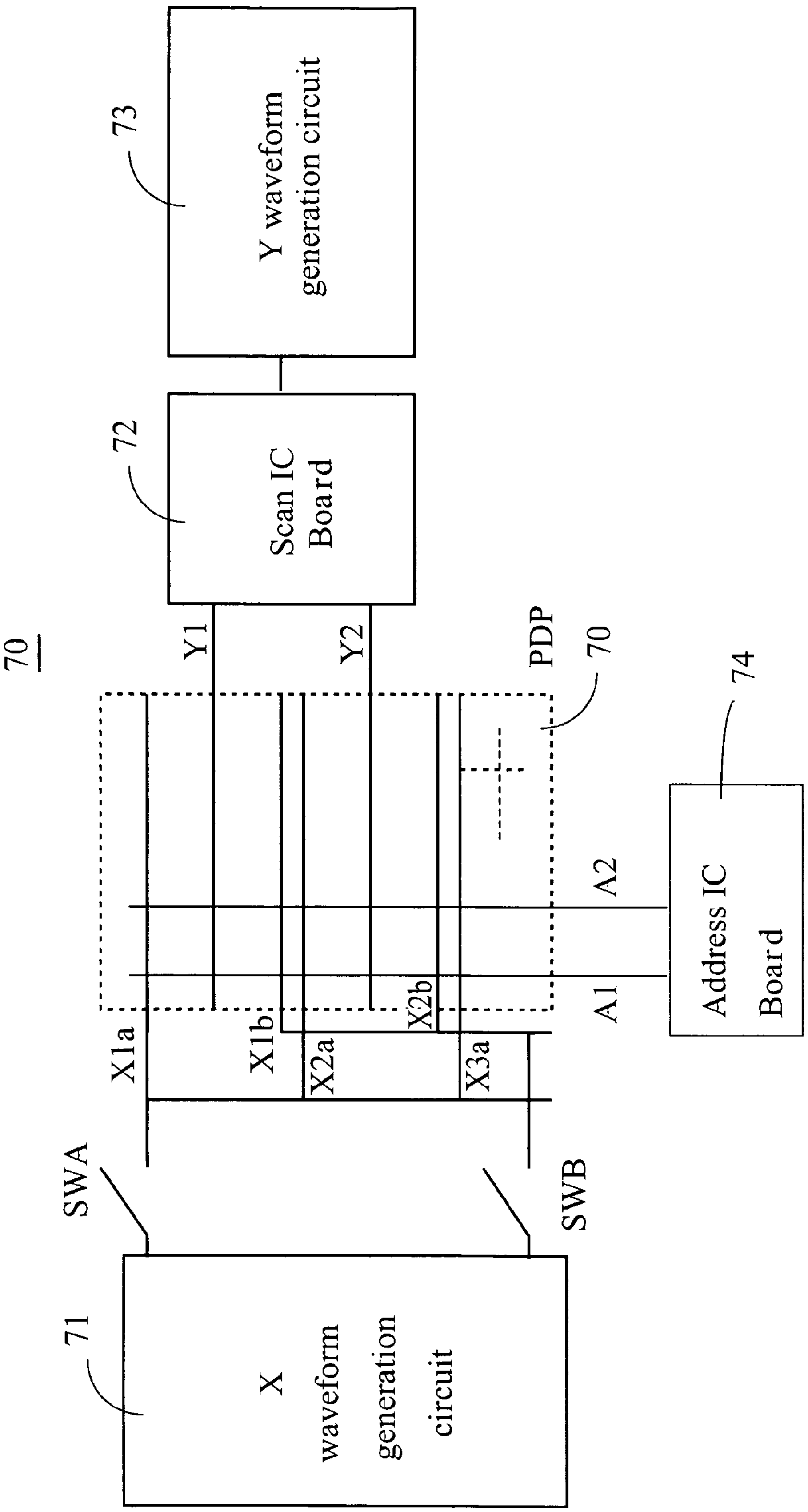
FIG. 7 illustrates another example of a driving apparatus for a PDP according to the present invention.

FIG. 7 illustrates another example of driving apparatus 70 of the present invention. Apparatus 70 includes X waveform generation circuit 71. Additionally, apparatus 70 has scan IC board 72 with Y waveform generation circuit 73. X waveform generation circuit 72 is connected to both the Xa electrodes and the Xb electrodes of PDP 10, via switches SWA and SWB, respectively. Further, apparatus 70 has address IC board 74 to drive electrodes A1, A2, . . . AN.

In operation, X waveform generation circuit 71, Y waveform generation circuit 73 and address IC board 74 apply waveforms to Xa, Xb, Y and A electrodes, respectively. In the sustain period, in order to display odd-numbered fields, the switch SWB is turned off and the switch SWA is turned on. That is, Xb electrodes are disconnected from X waveform generation circuit 71 and X waveform generation circuit 71 only applies sustain pulses to the Xa electrodes. While displaying even-numbered fields, the switch SWA is turned off and the switch SWB is turned. That is, the Xa electrodes are disconnected from X waveform generation circuit 71 and X waveform generation circuit 71 only applies sustain pulses to the Xb electrodes. Since only one X waveform generation circuit 71 is needed, circuit cost is reduced.

According to the exemplary embodiments described herein, the voltage difference between the Xa electrodes and the Xb electrodes in the sustain period will be lower than that of conventional techniques, resulting in no undesired gas discharge and dielectric breakdown between Xa and Xb. Additionally, the driving apparatus will not apply sustain pulses to the floating electrodes, hence energy loss is also reduced.

Furthermore, it should be noted that the techniques of the present application may be utilized in any of the operational periods of a PDP, in particular, they may be utilized in the sustain, reset, and scan periods.

It will be apparent to those skilled in the art that various modifications and variations can be made to the apparatus, method and system for driving a display device of the present application without departing from the spirit or scope of the invention. Thus, it is intended that the present invention covers the modifications and variations of this invention provided they come within the scope of the appended claims and their equivalents.

I claim:

1. A driving apparatus for a display device having a first plurality of row electrodes and a second plurality of row electrodes, said driving apparatus comprising:

a first waveform generating circuit configured to generate a first predetermined waveform and a second waveform generating circuit configured to generate a second predetermined waveform, wherein the first waveform generating circuit provides the first predetermined waveform to a first set of the first plurality of row electrodes, and the second waveform generating circuit provides the second predetermined waveform to the second plurality of row electrodes during a first time period, and wherein the first waveform generating circuit provides the first predetermined waveform to a second set of the first plurality of row electrodes, and the second waveform generating circuit provides the second predetermined waveform to the second plurality of row electrodes during a second time period, and wherein the row electrodes are configured in a sequence comprising a plurality of triplets Xa-Y-Xb, wherein Xa denotes the first set of the first plurality of row electrodes, Y denotes the second plurality of row electrodes and Xb denotes the second set of the first plurality of row electrodes, wherein:

odd display lines are located between the adjacent Xa electrodes and the Y electrodes, even display lines are located between the adjacent Xb electrodes and the Y electrodes, and such that voltage differences between the adjacent Xa electrodes and the Y electrodes may cause a discharge operation while displaying the odd fields, and voltage differences between the adjacent Xb electrodes and the Y electrodes may cause a discharge operation while displaying the even fields.

2. The driving apparatus of claim 1, further comprising:

a first switch coupled to the first waveform generating circuit; and a second switch coupled to the first waveform generating circuit, wherein the first switch is on during the first time period, and wherein the second switch is on during the second time period.

3. The driving apparatus of claim 1, further comprising a scan IC board connected to the second waveform generating circuit and the second plurality electrodes.

4. A driving apparatus for a display device having a first plurality of row electrodes and a second plurality of row electrodes, said driving apparatus comprising:

a first waveform generating circuit configured to generate a first predetermined waveform and a second waveform generating circuit configured to generate a second predetermined waveform, wherein the first waveform generating circuit provides the first predetermined waveform to a first set of the first plurality of row electrodes, and the second waveform generating circuit provides the second predetermined waveform to the second plurality of row electrodes during a first time period, wherein the first waveform generating circuit provides the first predetermined waveform to a second set of the first plurality of row electrodes, and the second waveform generating circuit provides the second predetermined waveform to the second plurality of row electrodes during a second time period, wherein the first waveform generating circuit comprises:

a first set of the first waveform generating circuit configured to provide a first predetermined waveform to the first set of the first plurality of row electrodes, and the second waveform generating circuit provides the second predetermined waveform to the second plurality of row electrodes during the first time period; and a second set of the first waveform generating circuit configured to provide a second predetermined waveform to the second set of the first plurality of row electrodes, and the second waveform generating circuit provides the second predetermined waveform to the second plurality of row electrodes during the second time period; and wherein the row electrodes are configured in a sequence comprising a plurality of triplets Xa-Y-Xb, wherein Xa denotes the first set of the first plurality of row electrodes, Y denotes the second plurality of row electrodes and Xb denotes the second set of the first plurality of row electrodes, and wherein:

odd display lines are located between the adjacent Xa electrodes and the Y electrodes, even display lines are located between the adjacent Xb electrodes and the Y electrodes, and such that voltage differences between the adjacent Xa electrodes and the Y electrodes may cause a discharge operation in the odd fields, and voltage differences between the adjacent Xb electrodes and the Y electrodes may cause a discharge operation in the even fields.

5. The driving apparatus of claim 4, further comprising a scan IC board connected to the second waveform generating circuit and the second plurality electrodes.

6. A method for driving a display device, the display device having a first plurality of row electrodes, a second plurality of row electrodes, and wherein the first plurality of row electrodes is grouped into a first set of the first plurality of row electrodes, and a second set of the first plurality of row electrodes, said method comprising:

in a first time period, generating a first predetermined waveform and applying the first predetermined waveform to the first set of the first plurality of row electrodes, and generating a second predetermined waveform and applying the second predetermined waveform to the second plurality of row electrodes; and in a second time period, generating a first predetermined waveform and applying the first predetermined waveform to the second set of the first plurality of row electrodes, and generating a second predetermined waveform and applying the second predetermined waveform to the second plurality of row electrodes;

wherein during the first time period, the second set of the first plurality of row electrodes is maintained floating; and during the second time period, the first set of the first plurality of row electrodes is maintained floating.

7. A system for driving a display device, the display device including a first plurality of row electrodes, and a second plurality of row electrodes, wherein the first plurality of row electrodes is grouped into a first set of the first plurality of row electrodes, and a second set of the first plurality of row electrodes, the system comprising:

a first means for applying a first predetermined waveform to the first set of the first plurality of row electrodes, a second means for applying the first predetermined waveform to the second set of the first plurality of row electrodes, a third means for applying a second predetermined waveform to the second plurality of row electrodes, wherein the first means and third means are utilized in a first time period, and the second means and third means are utilized in a second time period; and a fourth means for maintaining the second set of the first plurality of row electrodes floating in the first time period, and a fifth means for maintaining the first set of the first plurality of row electrodes floating in the second time period.

8. A driving apparatus for a display device having a first plurality of row electrodes and a second plurality of row electrodes, the first plurality of row electrodes being divided into a first set of the first plurality of row electrodes and a second set of the first plurality of row electrodes, said driving apparatus comprising:

a first waveform generating circuit configured to generate a first predetermined waveform and a second waveform generating circuit configured to generate a second predetermined waveform, wherein the first waveform generating circuit provides the first predetermined waveform to the first set of the first plurality of row electrodes, and the second waveform generating circuit provides the second predetermined waveform to the second plurality of row electrodes during a first time period, wherein the first waveform generating circuit provides the first predetermined waveform to the second set of the first plurality of row electrodes, and the second waveform generating circuit provides the second predetermined waveform to the second plurality of row electrodes during a second time period, and wherein during the first time period, the second set of the first plurality of row electrodes is maintained floating.

9. The driving apparatus of claim 8, wherein during the second time period, the first set of the first plurality of row electrodes is maintained floating.

10. The driving apparatus of claim 9, wherein the row electrodes are configured in a sequence comprising a plurality of triplets Xa-Y-Xb, wherein Xa denotes the first set of the first plurality of row electrodes, Y denotes the second plurality of row electrodes, and Xb denotes the second set of the first plurality of row electrodes, wherein:

odd display lines are located between the adjacent Xa electrodes and the Y electrodes, even display lines are located between the adjacent Xb electrodes and the Y electrodes, and such that voltage differences between the adjacent Xa electrodes and the Y electrodes may cause a discharge operation while displaying the odd fields, and voltage differences between adjacent Xb electrodes and the Y electrodes may cause a discharge operation while displaying the even fields.

11. The driving apparatus of claim 10, further comprising a scan IC board connected to the second waveform generating circuit and the second plurality electrodes.

* * * * *